(12) United States Patent
Vangala et al.

(10) Patent No.: US 11,886,748 B2
(45) Date of Patent: *Jan. 30, 2024

(54) SYSTEMS AND METHODS FOR CONTEXTUAL MEMORY CAPTURE AND RECALL

(71) Applicant: Microsoft Technology Licensing, LLC, Redmond, WA (US)

(72) Inventors: Vipindeep Vangala, Hyderabad (IN); Deepinder S. Gill, Hyderabad (IN); Snehdip Karandikar, Hyderabad (IN); Ananthatejas Raghavan, Hyderabad (IN); Nithin Kumar Mara, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,428

(22) Filed: Jul. 25, 2022

(65) Prior Publication Data
US 2022/0357895 A1 Nov. 10, 2022

Related U.S. Application Data

(63) Continuation of application No. 15/391,947, filed on Dec. 28, 2016, now Pat. No. 11,409,463.

(51) Int. Cl.
*G06F 3/06* (2006.01)
*G06N 5/02* (2023.01)
*G06Q 10/00* (2023.01)

(52) U.S. Cl.
CPC .......... *G06F 3/0659* (2013.01); *G06F 3/0611* (2013.01); *G06F 3/0673* (2013.01); *G06N 5/02* (2013.01); *G06Q 10/00* (2013.01)

(58) Field of Classification Search
CPC ......... G06F 17/30463; G06F 17/30321; G06F 17/30589; G06F 11/3409

(Continued)

(56) References Cited

U.S. PATENT DOCUMENTS

2009/0024543 A1* 1/2009 Horowitz ........... G06Q 30/0283
705/400
2017/0075988 A1* 3/2017 Kadiri ................. G06F 16/3329

FOREIGN PATENT DOCUMENTS

| CN | 101479720 A | 7/2009 |
| CN | 102812478 A | 12/2012 |
| CN | 104252498 A | 12/2014 |

OTHER PUBLICATIONS

"First Office Action and Search Report Issued in Chinese Patent Application No. 201780079304.3", dated Sep. 27, 2022, 12 Pages.

(Continued)

*Primary Examiner* — Hung T Vy

(57) ABSTRACT

Systems and methods for contextual memory capture and recall are provided. The contextual memory capture and recall systems and methods help a user create, store, and recall memory information associated with an identified activity. The contextual memory capture and recall systems and methods are capable of identifying user activities where a memory inquiry may be desirable, creating a memory inquiry with a recommended memory action based on the activity, providing the memory inquiry to the user, and automatically linking an accepted memory action, along with any received memory information for the memory action, with the identified activity.

20 Claims, 10 Drawing Sheets

(58) Field of Classification Search
USPC .......................... 707/700, 791, 713; 711/154
See application file for complete search history.

(56) References Cited

OTHER PUBLICATIONS

"Notice of Allowance Issued in Chinese Patent Application No. 201780079304.3", dated Feb. 27, 2023, 4 pages.

* cited by examiner

Questions for your Doctor

1. Is current medication as needed or must I complete the course?
2. How common is the health issue I am facing?
3. How long does the full recovery usually take?
4. Will I recover faster with operation or just medication?

What did I want to ask Doctor?

FIG. 3B

I noticed you have doctors appointment today. Do you want me to remember questions you want to ask your doctor today? I can keep these questions and you last prescription available for you when you reach your doctors office.

[ Yes, I want to record days summary ] [ Dismiss ]

FIG. 3A

I noticed you are on a 3 day trip of New York and just completed your first day. Do you want to record a summary of how your first day on this trip was so that I can help you recall it any time or add it to your tour diary at the end of the trip? I can help you record things like places you visited and what you liked the most about those places.

[ Yes, I want to record days summary ] [ Dismiss ]

FIG. 3C

SYSTEMS AND METHODS FOR CONTEXTUAL MEMORY CAPTURE AND RECALL

CROSS-REFERENCE TO RELATED APPLICATIONS

This application is a continuation application of U.S. patent application Ser. No. 15/391,947, filed on Dec. 28, 2016, now U.S. Pat. No. 11,409,463, the entire disclosure of which is hereby incorporated by reference in its entirety.

BACKGROUND

Language understanding systems, personal digital assistants, agents and artificial intelligence (AI) are changing the way users interact with the computers. Developers of computers, web services, and/or applications are always trying to improve the interactions between humans and computers. The language understanding systems, personal digital assistants, agents and artificial intelligence are typically utilized to communicate with users and/or to complete basic tasks.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for contextual memory capture and recall. The contextual memory capture and recall systems and methods help a user create, store, and recall memory information associated with an identified activity. The contextual memory capture and recall systems and methods are capable of identifying user activities and determining if a memory inquiry would be desirable for each identified activity. In response to a determination that a memory inquiry would be desirable for an activity, the contextual memory capture and recall systems and methods are further capable of creating a memory inquiry with a recommended memory action based on the activity, providing the memory inquiry to the user, and automatically linking an accepted memory action, along with any received memory information for the memory action, with the identified activity.

One aspect of the disclosure is directed to a system for contextual memory capture and recall. The system includes at least one processor and a memory. The memory encodes computer executable instruction that, when executed by the at least one processor, are operative to:
  collect user context signals from a client computing device of a user;
  enrich user context elements from the user context signals with world knowledge to form enriched context elements;
  identify an activity of the user based on the enriched context elements, wherein the activity is a future activity;
  evaluate the activity based on inquiry rules;
  determine that a memory inquiry for the activity is desirable based on the evaluation of the activity;
  create an appropriate memory inquiry based on the activity and creation rules;
  evaluate the enriched context elements based on notification rules in response to the determination that the memory inquiry is desirable;
  collect memory input from the client computing device in response to the memory inquiry;
  create a memory action based on the memory input, wherein the memory action includes a recall of the memory information;
  link the memory action with a first boundary of the activity;
  detect the first boundary based on the enriched context elements; and
  in response to detection of the first boundary, send instructions to the client computing device to provide the memory information to the user.
The memory input includes memory information.

In another aspect, a method for contextual memory capture and recall is disclosed. The method includes:
  collecting context signals from at least one client computing device of a user;
  enriching context elements from the context signals with world knowledge to form enriched context elements;
  identifying an activity of the user based on the enriched context elements;
  determining that a memory inquiry for the activity is desirable based on an evaluation of the activity;
  providing the memory inquiry to the user;
  collecting memory input from the user in response to the memory inquiry;
  creating a memory action in response the memory input, wherein the memory action includes a recall of the memory information; and
  linking the memory input with at least one boundary of the activity.
The memory input includes memory information input by the user.

In yet another aspect of the invention, the disclosure is directed to a system for contextual memory capture and recall. The system includes at least one processor and a memory. The memory encodes computer executable instruction that, when executed by the at least one processor, are operative to:
  collect context signals from at least one client computing device of a user;
  enrich the context signals with world knowledge to form enriched context elements;
  identify an activity of the user based on the enriched context elements;
  determine that a memory inquiry for the activity is desirable based on an evaluation of the activity;
  creating the memory inquiry based on the activity in response to a determination that the memory inquiry is desirable for the activity;
  provide the memory inquiry to the at least one client computing device;
  collecting memory input from the at least one client computing device in response to the memory inquiry; and
  link a memory action with a boundary of the activity in response to the memory input.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

FIG. 3A is a simplified schematic diagram illustrating a user interface of a client computing device displaying a first memory inquiry for a first identified activity of the user, in accordance with aspects of the disclosure.

FIG. 3B is a simplified schematic diagram illustrating the user interface of FIG. 3A displaying, in response to a boundary detection of the first identified activity, memory information from memory input for the first identified activity, in accordance with aspects of the disclosure.

FIG. 3C is a simplified schematic diagram illustrating the user interface of FIG. 3A displaying a second memory inquiry for a second identified activity of the user, in accordance with aspects of the disclosure.

DETAILED DESCRIPTION

Figure 1A:
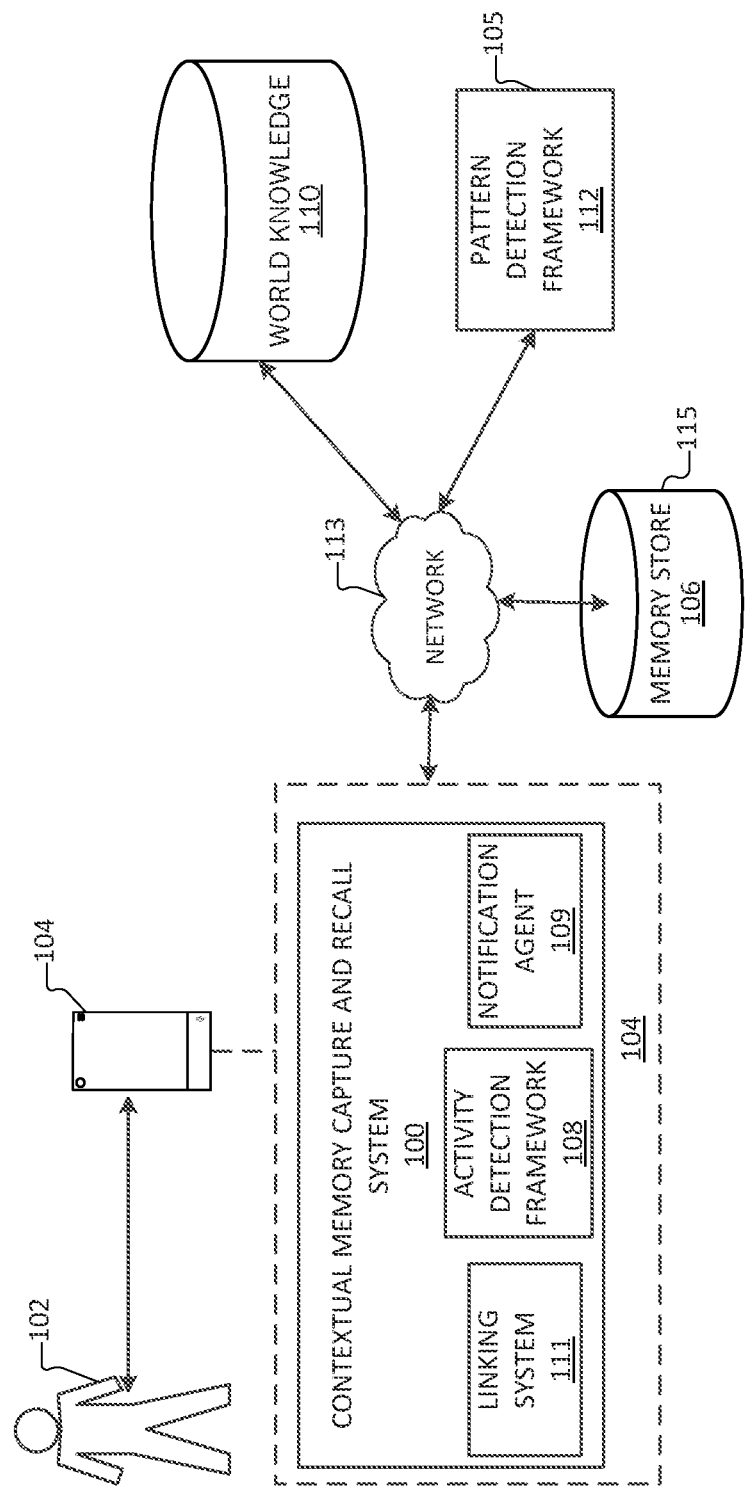
FIG. 1A is a schematic diagram illustrating a contextual memory capture and recall system on a client computing device, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Progress in machine learning, language understanding and artificial intelligence are changing the way users interact with the computers. Digital assistant applications, such as Siri, Google Now and Cortana are examples of the shift in human computer interaction.

Human memory cannot record and recall everything. It is almost impossible to remember everything that a person needs to remember to complete every activity every time. Often, people find themselves thinking 'oh I did not ask this question to this person I met' or 'I forgot to call this person as promised before my flight took off,' etc.

Currently, language understanding systems, personal digital assistants, agents and artificial intelligence are utilized to communicate with users and/or to complete basic tasks. These previously utilized systems and methods are capable of providing reminders with user entered information. However, these reminders are only created upon user request. Further, the user has to identify a trigger event for displaying a created reminder, such as an activity, a location, or a time of day. In other words, the user has to identify that a reminder is desired, enter any desired memory information, and/or then link this reminder and information to a desired trigger activity. Further, while these previously utilized systems and methods may suggest actions based on detected user activities, these previously utilized systems and methods do not suggest the performance of memory actions, such as the creation reminders with memory input related to current or future identified activities. As such, these previously utilized systems and methods had only user initiated memory capture and recall and/or user provided associations for memory capture and recall.

Therefore, systems and methods for contextual memory capture and recall are disclosed herein. The systems and methods for contextual memory capture and recall utilize enriched user context signals to identify user activities and to determine if a memory inquiry would be desirable, beneficial, or appropriate for the user for each identified activity. The systems and methods for contextual memory capture and recall then create an appropriate memory inquiry with a memory action recommendation based at least on the activity. A memory inquiry as used herein refers to a request for approval to perform a memory action associated with an identified activity. The memory inquiry is presented to the user for an identified activity and requests memory input in response from the user. The memory input may be an approval of a memory action along with user provided memory information. The system and methods automatically link the memory action and/or the memory information with the identified activity. The ability of the systems and methods described herein to identify user activities that may benefit from a memory inquiry and to automatically link memory input received in response to this inquiry with the activity creates an application, such as a digital assistant, that improves a user's ability to accomplish tasks, improves the recall and capture of needed memory items, and improves the usability, performance, and/or user interactions of/with the application when compared to previously utilized applications that do not provide memory inquires in response to identifying a user activity and/or that to not automatically link user entered memory input with a user activity.

Figure 1B:
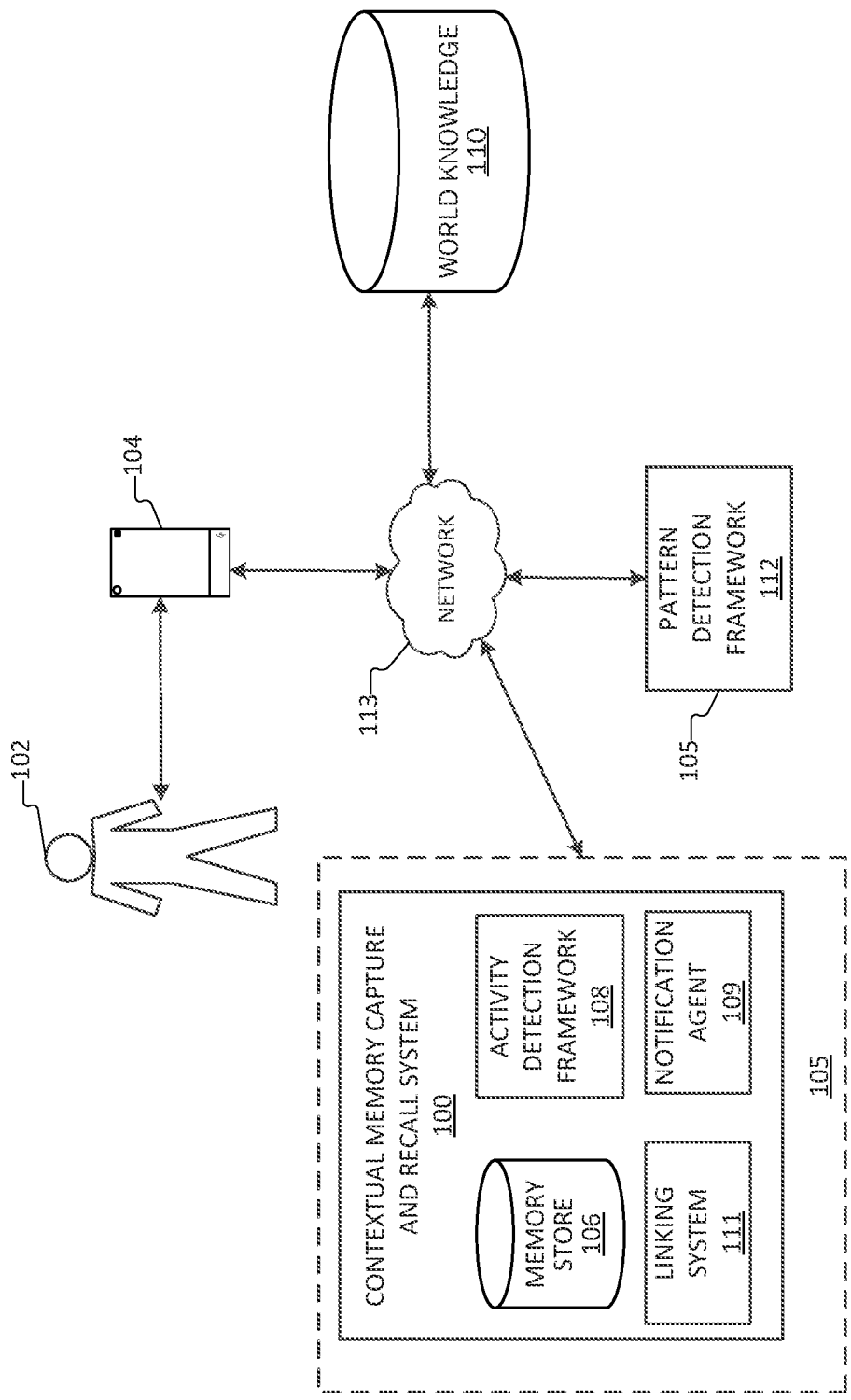
FIG. 1B is a schematic diagram illustrating a contextual memory capture and recall system on a server computing device being utilized by a user via a client computing device, in accordance with aspects of the disclosure.

FIGS. 1A and 1B illustrate different examples of a contextual memory capture and recall system 100 on a client computing device 104 being utilized by a user 102, in accordance with aspects of the disclosure. The contextual memory capture and recall system 100 is a system that helps a user create, store, and recall memory information for an activity. The contextual memory capture and recall system 100 includes an activity framework 108, a notification agent 109, and a linking system 111. The contextual memory capture and recall system 100 is capable of determining whether a memory inquiry is desirable to the user for an identified activity, creating a memory inquiry that recommends a memory action based on the activity, providing the memory inquiry to the user, and automatically linking the memory action and any received memory information with the identified activity. The contextual memory capture and recall system 100 is able to perform the above takes by determining the context of the user by analyzing received user context signals generated by the one or more of the user's devices 104 based on world knowledge 110. In contrast, previously utilized systems, such as digital assistants, only offered user initiated memory capture and recall and/or user provided associations for memory capture and recall.

The contextual memory capture and recall system 100 may also include a memory store 106 for storing memory input, memory information, enriched memory elements (such as enriched context elements), memory inquiries, memory actions, user patterns, and/or user feedback. In alternative aspects, the memory store 106 is stored on a database 115 separate and distinct from the contextual memory capture and recall system 100.

The contextual memory capture and recall system 100 may further include a pattern detection framework 112 for determining user patterns and/or user feedback based on the analysis of user context signals, other user signals, and/or world knowledge. In alternative aspects, the pattern detection framework 112 is on a server 105 separate and distinct from the contextual memory capture and recall system 100. In other aspects, the pattern detection framework 112 and/or the memory store 106 are not part of the contextual memory capture and recall system 100 but may be in communication with the contextual memory capture and recall system 100 for exchanging data.

In some aspects, the contextual memory capture and recall system 100 is implemented on the client computing device 104 as illustrated in FIG. 1A. In a basic configuration, the client computing device 104 is a computer having both input elements and output elements. The client computing device 104 may be any suitable computing device for implementing the contextual memory capture and recall system 100. For example, the client computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device 104 for implementing the contextual memory capture and recall system 100 may be utilized.

In other aspects, the contextual memory capture and recall system 100 is implemented on a server computing device 105, as illustrated in FIG. 1B. The server computing device 105 may provide data to and/or receive data from the client computing device 104 through a network 113. In some aspects, the network 113 is a distributed computing network, such as the internet. In further aspects, that contextual memory capture and recall system 100 is implemented on more than one server computing device 105, such as a plurality or network of server computing devices 105. In some aspects, the contextual memory capture and recall system 100 is a hybrid system with portions of the contextual memory capture and recall system 100 on the client computing device 104 and with portions of the contextual memory capture and recall system 100 on the server computing device 105.

Figure 2:
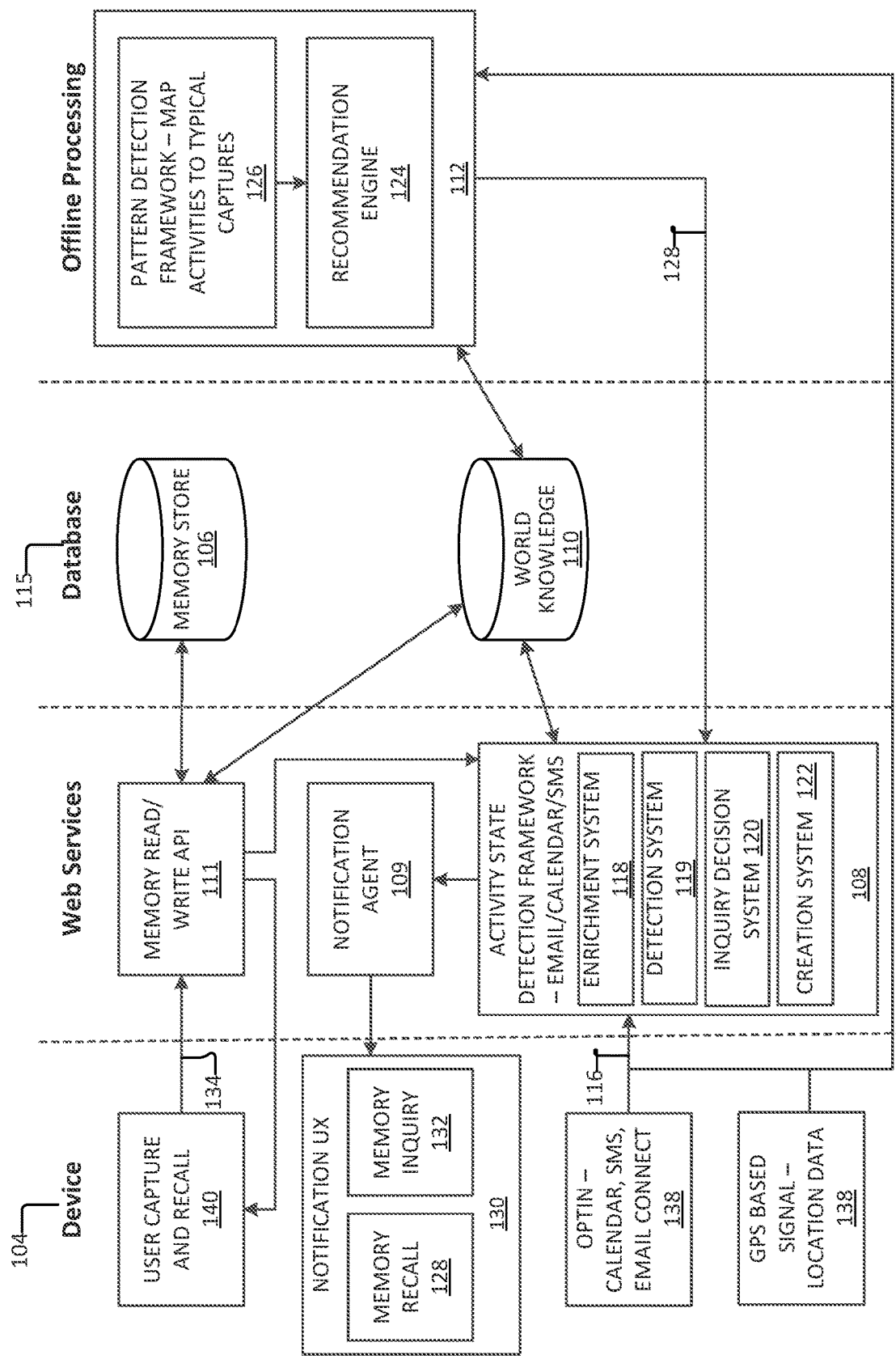
FIG. 2 is a simplified schematic block diagram illustrating use of a contextual memory capture and recall system, in accordance with aspects of the disclosure.

FIG. 2 is an example of a simplified schematic block diagram illustrating the use of a contextual memory capture and recall system 100, in accordance with aspects of the disclosure. As discussed above and as shown in FIG. 2, the contextual memory capture and recall system 100 includes an activity detection framework 108. The activity detection framework 108 of the contextual memory capture and recall system 100 collects user signals 116 including context signals. The term collect as utilized herein refers the active retrieval of items and/or to the passive receiving of items. The activity detection framework 108 of the contextual memory capture and recall system 100 may also collect world knowledge and/or additional user information 128, such as user feedback, user patterns, and/or other user enriched memory elements from a pattern detection framework 112.

The user signals 116 are produced by signal generators 138. The signal generators are one or more devices 104 of the user 102 and/or one or more applications 138 that run on the user's devices 104. For example, the client computing device 104 may include a user's desktop computer and/or a user's smart phone. In further examples, the applications 138 on the client computing device 104 that send user signals 116 may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, photo application, mapping application, an e-business application, a transactional application, an exchange application, a device control application, a web interface application, a calendaring application, etc.

The activity detection framework 108 of the contextual memory capture and recall system 100 receives the user signals 116 and/or the additional user information 128. The activity detection framework 108 includes an enrichment system 118, a detection system 119, an inquiry decision system 120, and a creation system 122.

The enrichment system 118 of the activity detection framework platform 108 collects the user signals 116 including user context signals. The user context signals include context elements of the user 102 and/or digital artifacts. The enrichment system 118 converts the digital artifacts into context elements utilizing world knowledge 110. Additionally, the enrichment system 118 enriches the context elements utilizing world knowledge 110. World knowledge 110 as utilized herein includes any information that can be accessed utilizing a network connection, such as search engines and databases. The user context signals are specific to and relate to a given user 102. The user context signals are signals that relate to the current state of the user 102. The current state or user context is the current environment of the user 102 and/or client computing device 104. For example, the current state or user context may be based on the current location of the user, current time, current weather, current digital behavior of the user, and/or current user physical actions. In additional aspects, the enrichment system 118 enriches all user signals to form memory elements and is not limited to the enrichment of user context signals.

For example, a digital artifact, such as GPS coordinates, has no context value to the user 102. However, upon a search of the world knowledge 110, the enrichment system 118 can determine that these coordinates are for a Starbucks at a specific address in Seattle, Washington. In response to this determination, the enrichment system 118 may convert the digital GPS coordinates into a context element of "Starbucks" and "Seattle." Further, the enrichment system 118 could search the world knowledge 110 to enrich the "Starbucks" context element and determine that "Starbucks" is a coffee shop. In this embodiment, the enrichment system 118 may enrich the "Starbucks" context element by tagging this context element as a "coffee shop." As such, the enrichment system 118 tags context elements and determines additional context elements to form enriched context elements.

The detection system 119 collects enriched context elements generated by the enrichment system 118. The detection system 119 analyzes the enriched context elements to identify a user activity. The user activity may be an activity that is going to occur in the future (a future activity) or an activity currently occurring (a current activity). For example, the identified future activity may be a doctor's appointment, a trip to New York, a relative's birthday, work meeting, etc. For example, an identified current activity may be the user's commute to work, day 1 of a trip to New York, a work meeting, etc. In some aspects, the detection system 119 analyzes or evaluates the enriched context signals based on a set of context rules. In further aspects, the detection system 118 also collects the additional user information 128, such as user feedback and user patterns. In these aspects, the context rules may be updated utilizing a learning algorithm based on the additional user information 128. Any learning algorithm referred to herein may include machine learning and/or statistical modeling techniques. The ability of the detection system 118 to update the context rules based on user feedback and/or user patterns allows the detection system 118 to continually evolve with the user 102 based on the user's patterns and/or feedback.

The identified user activity is collected by the inquiry decision system 120. The inquiry decision system 120 evaluates the identified user activity to determine if a memory inquiry for the activity is desirable. The inquiry decision system 120 utilizes inquiry rules to evaluate the first activity. In some aspects, the inquiry decision system 120 also collects the additional user information 128. In these aspects, the set of inquiry rules may be updated utilizing a learning algorithm based on the additional user information 128. The ability of the inquiry decision system 120 to update the inquiry rules based on user feedback and/or user patterns allows the inquiry decision system 120 to continually evolve with the user 102 based on the user's patterns and/or feedback. If the activity meets the inquiry rules, the inquiry decision system 120 determines that the memory inquiry for the identified activity is appropriate. If the activity does not meet the inquiry rules, the inquiry decision system 120 determines that the memory inquiry for the identified activity is not appropriate. For example, an identified activity of the user commute to work may not meet the rules for a memory inquiry. In another example, an identified activity of a doctor's appointment or an upcoming trip may meet the inquiry rules and qualify for memory inquiry. In some aspects, the inquiry rules are a list of identified current and future activities that are appropriate or desirable for a memory inquiry. In other aspects, the inquiry rules are list of identified current and future activities that are not appropriate or no desirable for a memory inquiry. However, this list of rules is exemplary only and is not limiting. Any suitable inquiry rules for determining if a memory inquiry is appropriate may be utilized by inquiry decision operation 120 as would be understood by a person of skill in the art.

In response to a determination that a memory inquiry is desirable by the inquiry decision system 120, the creation system 122 creates or forms a memory inquiry. The memory inquiry identifies the activity and requests approval to perform a memory action. A memory action as utilized herein refers to any action performed or the generation of instructions to perform any action related to the storage and/or recall of memory information in association with the identified activity. The recall of memory information associated with the identified activity is referred to herein as a memory recall. In some aspects, a memory recall may include a reminder or reminder information (also referred to herein as memory information) for an activity. In additional aspects, a memory recall may include memory information related to an activity that the user wants to store in association with the activity so that this activity related information can be recalled upon request. The creation system 122 creates the memory inquiry 132 based at least on the activity. In some aspects, the creation system 122 creates the memory inquiry 132 based further on world knowledge and/or the additional user information 128. In some aspects, the memory inquiry is determined or created by the creation system 122 based on which inquiry rule is met by the activity. For example, each inquiry rule or each identified activity that is suitable for a memory inquiry may be associated with a predetermined memory inquiry. The predetermined memory inquiry may be a template that is filled in based on an analysis of the activity, world knowledge and/or additional user information 128. In other aspects, the predetermined memory inquiry is a static prompt that does not change.

In alternative aspects, the memory inquiry is determined based on analysis of the activity along with world knowledge and/or additional user information 128 and is not based on predetermined memory inquiry. In aspects where the memory inquiry is not static, the creation system 122 may analyze or evaluate the activity based on a set of creation rules to form the memory inquiry. In further aspects, the creation system 122 also collects the additional user information 128 and/or world knowledge. In these aspects, the creation rules may be updated utilizing a learning algorithm based on the additional user information 128. The ability of the creation system 122 to update the creation rules based on user feedback and/or user patterns allows the creation system 122 to continually evolve with the user 102 based on the user's patterns and/or feedback.

Further, in these aspects, the creation system 122 may evaluate other enriched memory elements, world knowledge, and/or additional user information to determine if any memory information should be provided (or recommended) in the memory inquiry based on the creation rules. If any recommended memory information for the activity is identified by the creation system 122, the recommended memory information is provided in the created memory inquiry. In some aspects, creation system 122 creates the memory inquiry with a user interface or a selectable icon or button for accepting and/or rejecting the provided memory inquiry.

Additionally, the creation system 122 may add an explanation of a provided memory inquiry based on the activity and analysis of additional user information with the creations rules. For example, an explanation may only be provided the first time a specific kind of memory inquiry is provided or for a predetermined number of times that the specific kind of memory inquiry is provided. In other aspects, an explanation is provided by the creations system 122 based on how complicated the offered memory action is in the memory inquiry. These aspects are exemplary only and are not meant to be limiting. The explanation may be provided for any suitable reason as would be understood by a person of skill in the art.

For example, FIGS. 3A and 3C illustrate examples of different memory inquiries 132 displayed on a user interface 140. FIG. 3A displays a memory inquiry 132a in response to the identification of a user activity of a future doctor's appointment. The memory inquiry 132a notifies the user of the identified activity by reciting, "I noticed that you have doctor's appointment today." The memory inquiry 132*a* further includes a memory action of a request to provide reminder information for that activity by reciting, "Do you want me to remember questions you want to ask the doctor?" Additionally, the memory inquiry 132*a* provides additional relevant elements based on an analysis of the additional user information that relates to the identified doctor's appointment by reciting, "I can keep . . . your last prescription available for you when your reach the doctor's office." Further, the memory inquiry 132*a* also includes an acceptance button 142 and a rejection button 142 for the recommended memory action of the memory inquiry 132*a*.

FIG. 3C displays a memory inquiry 132*b* in response to the identification of a user activity of a 3 day trip to New York. Unlike the memory inquiry 132*a*, this memory inquiry 132*b* is for a current activity, such as day 1 of the three day trip. The memory inquiry 132*a* notifies the user of the identified activity by reciting, "I noticed that you are on a 3 day trip to New York and just completed your first day." The memory inquiry 132*b* further includes a request to perform a memory action related to the activity by reciting, "Do you want me to record a summary of how your first day on this trip was so that I can help you recall it anytime or add it to your tour diary at the end of the trip?" Additionally, the memory inquiry 132*b* provides an explanation of the things that would be recorded upon acceptance of the memory inquiry 132*b* by reciting, "I can help you record things like places you visited and what you like the most about those places." Further, the memory inquiry 132*b* also includes an acceptance button 142 and a rejection button 144 for the proposed memory action of the memory inquiry 132*b*.

The notification agent 109 determines a time period that is appropriate for providing a notification 130 to a user 102. The notification agent 109 sends instructions to the client computing device 104 to provide a notification 130 to the user 102. The notification 130 may include a memory inquiry 132 and/or a memory recall 134 (also referred to herein as recalled memory input). The notification agent 109 collects the memory inquiries 132 and/or recalled memory input 134 from the activity detection framework 108.

In response to the creation of memory inquiry 132 by the creation system 122 of the activity detection framework 108 and/or in response to a determination that a memory inquiry is desirable for the activity by inquiry decision system 120 of the activity detection framework 108, the notification agent 109 determines an appropriate time for providing the memory inquiry 132 to the user 102. The notification agent 109 collects the enriched context elements. In some aspects, the notification agent 109 also collects world knowledge and/or additional user information 128. The notification agent 109 evaluates the enriched context signals based on notification rules in response to the determination that the memory inquiry is desirable by the inquiry decision system 120 or in response to the creation of a memory inquiry 132 by the creation system 122. The notification rules may be updated utilizing a learning algorithm based on world knowledge and/or additional user information 128. The ability of notification agent 109 to update the notification rules based on user feedback and/or user patterns allows the notification agent 109 to continually evolve with the user 102 based on the user's patterns and/or feedback.

If the notification agent 109 determines that the current time period is appropriate for providing the memory inquiry to the user, the notification agent 109 provides or sends instructions to one or more user devices 104 to provide the memory inquiry 132 to the user 102. The one or more client computing devices 104 of the user provide the memory inquiry 132 to the user 102 in response to receiving the instructions from the notification agent 109. The client computing device 104 may provide the notification 130, such as the memory inquiry 132, to the user 104 via any suitable notification media, such visual, audio, tactile, and/or other sensory outputs. For example, the client computing device 104 may display the memory inquiry 132 and/or verbally recite the memory inquiry 132 utilizing artificial voice intelligence.

If the notification agent 109 determines that the current time period is not appropriate for providing the memory inquiry 132 to the user 102, the notification agent 109 does not send instructions to one or more user devices 104 to provide the memory inquiry 132 to the user 102 and instead continues to monitor for an appropriate time period for providing the memory inquiry 132 to the user 102. For example, if the notification agent 109 determines that the user is driving or sleeping based on an analysis of the enriched context elements, the notification agent 109 may determine that this time period is not appropriate for a display of a notification 130.

In response to receiving the memory inquiry 132, the user may input into a user interface 140 of the one or more client computing device 104 a memory input 134. The contextual memory capture and recall system 100 collects the memory input 134 from the one or more client computing devices 104. The linking system 111 of the contextual memory capture and recall system 100 collects the memory input 134. The linking system 111 is a memory read and write application programming interface (API). The linking system 111 reads or understands the received memory input 132. The memory input 134 includes an acceptance or a rejection of the proposed memory action in the memory inquiry. In some aspects, the memory input 134 includes memory information provided by the user. In further aspects, the receipt of memory information is interpreted by the linking system 111 as an implicit acceptance of the memory inquiry 132. If the linking agent reads the memory input 134 and determines that the memory input is a rejection of the memory inquiry, the linking agent 111 sends the rejection to the memory store 106.

If the linking agent reads the memory input 134 and determines that the memory input is an acceptance of the memory inquiry, the linking agent 111 links or associates the memory action with the activity. In some aspects, the linking agent 111, in response to an acceptance of the proposed memory action also gathers memory information for the activity. For example, the linking system 111 may request or send instructions to the one or more user devices 104 to request memory information in response to the acceptance. The one or more user devices 104 provide the memory information request to the user. The user 102 may provide additional memory information via the user interface 140 in response to the memory information request. The user device 104 sends the user inputted memory information to the contextual memory capture and recall system 100. The linking system 111 of the contextual memory capture and recall system 100 collects the user inputted memory information from the user device 104. Memory information collected after the acceptance of the memory inquiry 132 by the linking system 111 is considered part of the memory input 134.

In further aspects, the linking system 111 analyzes the proposed memory action and/or the memory information in the memory input. Based on this analysis, the linking system 111 may collect additional memory information from world knowledge and/or additional user information. This additional memory information collected by the linking system 111 is considered part of the memory input 134.

Once all of the memory input has been collected by the linking system 111, the linking system 111 creates or writes instructions to perform a memory action. In some aspects, the linking system 111 links the memory action to the activity by links or associating the memory action with one or more boundaries of the activity. In further aspects, the linking system 111 links the memory action to the activity by linking or associating the storage of memory information with the activity. The memory action may be the display of inputted memory information from the user and/or gathered additional memory information by the linking system 111. Alternatively, the memory action may be the recording of specific memory events, such as the detection and recording of memory elements for activities associated with the identified activity, such as places that were visited during a trip, things a user liked during a trip, and/or adding recorded memory elements to a specific store or database.

Once the linking system 111 has created the memory action and linked the memory action to the activity, the linking system 111 sends this information to the memory store 106. The memory store 106 stores the created memory action and the associated one or more activity boundaries. The memory store 106 may collect and store any enriched memory elements of the user. In some aspects, the enriched memory elements or a portion of the enriched memory elements may be formed by the contextual memory capture and recall system 100. The enriched memory elements may include enriched context elements formed by the contextual memory capture and recall system 100. In other aspects, the enriched memory elements or a portion of the enriched memory elements are formed by systems separate from the contextual memory capture and recall system 100. The contextual memory capture and recall system 100 and/or with the pattern detection system 112 collect information from the memory store 106.

The pattern detection framework 112 collects enriched memory elements from the user. The enriched memory elements include user feedback. The feedback may be explicit or implicit. Explicit feedback from the user is feedback input by the user. For example, explicit user feedback is when the user selects or provides input that indicates that a specific memory inquiry or memory action was helpful or not helpful. In contrast, implicit feedback is determined by monitoring of user behavior in response to a provided memory action. For example, the selection/non-selection of presented memory information, the duration of use, and/or the pattern of use of provided memory actions may be monitored to determine user feedback 148.

In some aspects, the pattern detection framework 112 may collect user signals from one or more signal generators and enrich the user signals to form enriched memory elements. In other aspects, the enriched memory elements are collected from systems separate and distinct from the pattern detection framework 112. The enriched memory elements are formed by enriching elements in the user signals collected from signal generators with world knowledge 110. The user signals include all types of user elements, such as user context elements.

The pattern detection framework 112 includes a mapping system 126 and a recommendation system 124. The mapping detection system 126 determines a user pattern by mapping user enriched memory elements to different activities. The recommendation engine 124 may utilize the determined user pattern to recommend additional memory information for a memory inquiry and/or to recommend an update of a learning algorithm.

In some aspects, the mapping system 126 of the pattern detection framework analyzes the activity. The mapping system 126 analyzes the activity by mapping the activity to enriched memory elements of different activities. The recommendation engine 124 identifies a related activity based on the analysis of the activity. The recommendation engine 124 links or associates one or more boundaries of the related activity to the memory action created for the activity. In some aspects, the related activities are future activities. The recommendation engine sends a recommendation to the activity state detection framework 108 to monitor for the one or more boundaries of the related activity to provide the memory action of the activity in response to a detection of the one or more boundaries of the related activity. In alternative aspects, the recommendation engine sends a recommendation to the activity state detection framework 108 to monitor for the one or more boundaries of the related activity to provide a new memory inquiry for the related activity that relates to the activity in response to a detection of the one or more boundaries of the related activity. The new memory inquiry may request to record memory information for the related activity and to associate this memory information with memory information for the activity and/or the related activity. Alternatively, the new memory inquiry may request approval to display memory information related to the activity in response to detection of a boundary for the related activity.

For example, the activity state detection framework 108 may detect boundaries for related activities that occur during a main activity of a three day trip to New York (as illustrated by the memory inquiry 132c in FIG. 3C). In this example, in response to detecting a boundary for a related activity (such as trip to the Metropolitan Art Museum), memory information (such as pictures taken at the museum) is recorded for the related activity and associated with the main activity (three day trip to New York) and/or the related activity. Alternatively in this example, in response to detecting a boundary for a related activity, a memory inquiry is provided requesting permission to record memory information for the related activity and associate the memory information with the related activity and/or the main activity (3 day trip to NY).

In response to receiving a recommendation from the recommendation engine 124 of the pattern detection framework 112, the activity detection framework 108 may monitor for and detect the one or more boundaries of the related activity based on the enriched context elements. If the activity detection framework 108 does not detect the one or more boundaries of the related activity, the activity detection framework 108 continues to monitor for the one or more boundaries. If the activity detection framework 108 detects the one or more boundaries of the related activity, the activity detection framework 108 performs the memory action created in response to the activity again in response to the detection of the one or more boundaries for the related activity. Alternatively, if the activity detection framework 108 detects the one or more boundaries of the related activity, the activity detection framework 108 presents a memory inquiry requesting permission to perform the memory action created in response to the main activity again in response to the detection of the one or more boundaries for the related activity. If the memory action includes a display notification, the activity framework 108, as discussed above, may send this notification to the notification agent.

The pattern detection framework 112 collects or shares any determined user pattern, user feedback, enriched memory elements, and/or recommendation as additional user information to the memory store 106 for storage. Further, the pattern detection framework 112 sends or shares any determined user pattern, user feedback, enriched memory elements, and/or recommendation as additional user information to/with the activity detection framework 108.

The activity detection framework 108 receives instructions to detect one or more boundaries for the activity. The boundaries of the activity may include before a start of the activity, a start time of the activity, occurrence of the activity, and/or a completion of the activity. The activity detection framework 108 detects one or more boundaries of the activity based on analysis of the enriched context signals. If the activity detection framework 108 does not detect a boundary of an action that is linked to a memory action, the activity state detection framework 108 continues to monitor for the boundary of the activity. If the activity detection framework 108 detects a boundary of an activity that is linked to a memory action, the activity state detection framework 108 performs the memory action linked to that activity. If the memory action requires sending a notification to the user, such as the display of memory information, the activity state detection framework 108 sends the notification to the notification agent 109. The display of memory information may also be referred to herein as a memory recall 128.

As discussed above, the notification agent 109 determines a time period that is appropriate for providing a notification 130 to a user 102. The notification agent 109 provides or sends instructions to the client computing device 104 to provide a notification 130 to the user 102. In alternative aspects, a notification 140 required by a memory action is automatically provided by the notification agent 109 to the client computing device 104 upon receipt.

FIG. 3B illustrates an example of the user interface of FIG. 3A displaying, in response to a boundary detection of the first identified activity, recalled memory input 128 for the first identified activity, in accordance with aspects of the disclosure. As discussed above, the identified activity is a doctor's appointment. The boundary linked to the doctor's appointment may be before a start of the activity, a start time of the activity, and/or occurrence of the activity. The recalled memory input 128b includes memory information input by the user in response to the memory inquiry 132a. The memory information input by the user includes questions for the doctor for his or her doctor appointment. In some embodiments, memory information associated with a memory input recall 128 can be requested and/or edited by the user prior to the occurrence of a linked activity boundary for that memory input recall 128 upon a search for the activity by the user.

Figure 4:
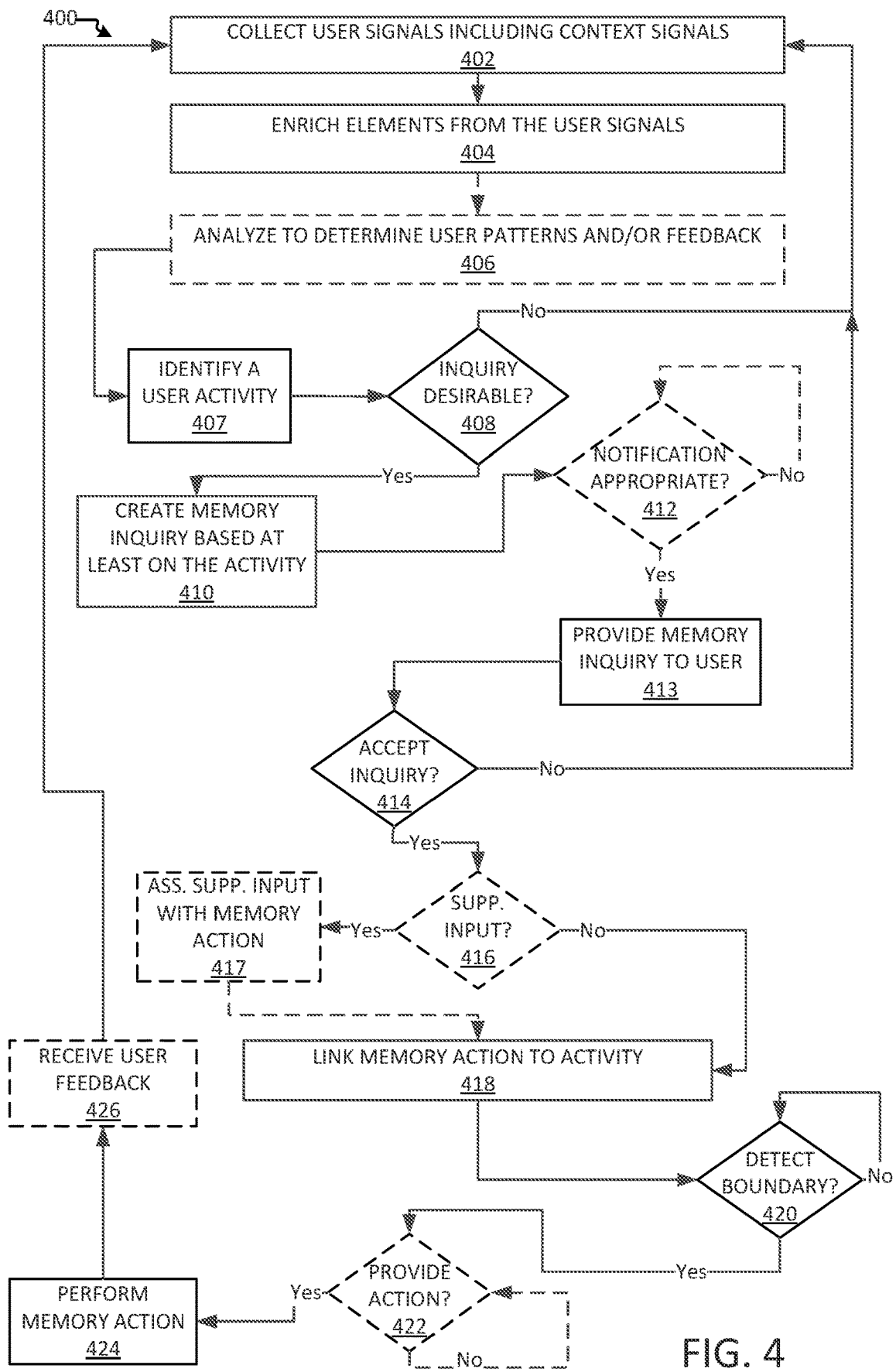
FIG. 4 is a block flow diagram illustrating a method for contextual memory capture and recall, in accordance with aspects of the disclosure.

FIG. 4 illustrates a flow diagram conceptually illustrating an example of a method 400 for contextual memory capture and recall. In some aspects, method 400 is performed by the contextual memory capture and recall system 100 as described above. Method 400 provides an application that improves a user's ability to accomplish tasks, improves the recall of needed memory items, improves the usability, performance, and/or user interactions of/with an application when compared to previously utilized applications that do not provide memory inquiries based on a detected activity, or link memory actions to the detected activity based on the receipt of memory input in response to the memory inquiry. For example, method 400 may ask the user if memory information for later use is desired even before the user realizes that storage of memory information would be beneficial.

Method 400 includes operation 402. At operation 402, user signals, including user context signals, are collected. The user signals are collected from signal generators. In some aspects, the signal generators are at least one of client devices, servers, and/or applications. The user signals include memory elements and/or digital artifacts. As utilized herein, digital artifacts are converted into element utilizing world knowledge and/or other user information. In some aspects, the memory elements and/or digital artifacts in the user signals may include user feedback, GPS coordinates, photos, browser history, emails, text messages, social data, notebooks, to-dos, calendar items, professional data, events, and/or application data. As utilized herein, digital artifacts are data that the user would not recognize as a memory element until it is further processed. For example, a digital artifact may include GPS coordinates or computer encoded data. The user signals are collected continuously, upon predetermined conditions, and/or after a predetermined amount of time at operation 402. As such, new or updated user contexts, user patterns, user feedback, activities, etc. may be determined based on each newly received user signal during method 400.

The user context signals are indicative of the current state of the user or the user context. The user context is consistently changing and/or being updated as time passes, the environment changes, user location changes, user behavior changes and/or user physical actions change. As discussed above, the current state of the user or the current user context is based on user context signals, such as the current location of the user, the current time, current weather, the current digital behavior of the user, and/or current user physical actions of the user.

Next, method 400 includes operation 404. At operation 404, memory elements, including user context elements, are enriched with the world knowledge to form enriched elements. In some aspects, at operation 404, digital artifacts in the user signals are converted into memory elements, such as context elements utilizing world knowledge and/or other user information. These memory elements may also be enriched at operation 404 utilizing world knowledge and/or other user information to form the enriched elements.

In some aspects, method 400 includes operation 406. At operation 406 the enriched memory elements are analyzed to determine user patterns and/or user feedback. In some aspects, operation 406 updates or trains the machine learning techniques and/or statistical modeling techniques of a learning algorithm based on the determined user feedback and/or user patterns. In additional aspects, the user feedback and/or the user patterns are added to the enriched memory elements.

It is understood by a person of skill in the art, that operations 402, 404, and/or 406 may be continuously performed by method 400. Further, it is understood by a person of skill in the art that the performance of operations 402, 404, and/or 406 may overlap with the performance of other operations of method 400. For example, method 400 may continue to collect and enrich user signals at operations 402 and 404 during the creation of a memory inquiry at operation 410.

After operation 404 and/or 406, operation 407 is performed during method 400. At operation 407, an activity of the user is identified based on the enriched context elements, world knowledge, and/or other user information. In some aspects, at operation 407, a related activity to a main activity is identified utilizing enriched context elements, world knowledge, and/or other user information. A main activity as utilized herein refers to an activity previously identified at operation 407. The related activity as utilized herein refers to any activity that is associated with or linked to a main activity. The activity and/or the related activity may be a future or current activity. The activity as utilized herein refers to any event, place, and/or occasion related to the user. For example, the activity may include a relative's birthday, a future doctor's appointment, being on vacation, arriving at a work meeting, etc. The activity is identified by analyzing the enriched context element, world knowledge, and/or other user information in view a set of context rules. In some aspects the context rules are updated utilizing a learning algorithm.

After operation 407, operation 408 is performed during method 400. At operation 408, the activity identified by operation 407 is evaluated to determine if a memory inquiry is desirable and/or appropriate. In some aspects, the activity is evaluated in view of a set of inquiry rules at operation 408. In some aspects, the inquiry rules are updated utilizing a learning algorithm. In these aspects, if the activity meets one or more inquiry rules, a memory inquiry is desirable or appropriate for a detected activity. In these aspects, if the activity does not meet one or more inquiry rules, a memory inquiry is not desirable or appropriate for a detected activity. If a determination is made at operation 408 that a memory inquiry is desirable or appropriate, operation 410 is performed. If a determination is made at operation 408 that a memory inquiry is not desirable or is not appropriate, operation 410 is not performed and method 400 may continue to perform operation 402.

Next, operation 410 is performed. At operation 410, a memory inquiry is created or formed based on the activity in response to a determination that the memory inquiry is desirable for the activity at operation 408. The memory inquiry is created by analyzing the activity, world knowledge, and/or other user information utilizing a set of creation rules. In some aspects, the creation rules are updated utilizing a learning algorithm. The memory inquiry created at operation 410 includes the identified activity and a request to perform one or more memory actions that relate to the identified activity. The memory action may include a request to collect memory information related to the activity from the user and/or from world knowledge and/or other user information. In further aspects, the memory inquiry includes recommended memory information that relate to the identified activity. The recommended memory information may be identified based on world knowledge, enriched user context elements, and/or other user information. In these aspects, the memory action may include a request to provide the recommended memory elements listed in the memory inquiry in a memory recall for the activity. In other aspects, the memory action is a request to identify and store one or more memory element for the activity for a memory recall for the activity. In further aspects, the memory action is a request to identify and store one or more memory elements for related activities for a memory recall for the main activity.

In some aspects, method 400 includes operation 412. At operation 412 a determination is made as to whether a current time period is appropriate to provide the memory inquiry. In these aspects, the enriched user context elements are evaluated to determine if the current time period is appropriate for providing the memory inquiry at operation 412. The enriched user context elements may be evaluated utilizing notification rules. In some aspects, the notification rules are updated utilizing a learning algorithm. In these aspects, if the enriched context elements meet one or more of the notification rules, the current time period is determined to be appropriate for providing the memory inquiry and operation 413 is performed. In these aspects, if the enriched context elements do not meet one or more of the notification rules, the current time period is determined to not be appropriate for providing the memory inquiry the received enriched user context elements are evaluated until an appropriate time period is determined or until the memory inquiry is no longer appropriate or desirable at operation 412.

After operation 410 and/or 412 is performed, operation 413 is performed during method 400. At operation 413 the memory inquiry is provided to the user or instructions are sent to one or more client computing devices to provide the memory inquiry to the user.

Next, at operation 414, memory input from the at least one client computing device is collected in response to the memory inquiry. The memory input is input by the user into the user interface of the client computing device. The memory input includes an acceptance or a rejection of the proposed memory action included in the memory inquiry. The memory input also includes any memory information for the activity input by the user via the user interface of client device in response to the memory inquiry. In some aspects, entry of memory information by the user in response to a memory inquiry is considered an acceptance of the memory action in the memory inquiry.

In some aspects, method 400 includes operations 416 and 417. At operation 416 the memory action and/or any received memory information the user is evaluated in view of world knowledge and/or other user information utilizing a learning algorithm to determine any supplemental memory information should be added to memory information utilizing by the memory action. If supplemental memory information is detected at operation 416, operation 417 is performed. If supplemental memory information is not detected at operation 416, operation 418 is performed.

At operation 417, the identified supplement memory information that is associated with the activity is added and stored with any memory information already associated with memory action.

Next, operation 418 is performed. At operation 418, the memory action is linked to the activity in response to receiving an acceptance of the memory action in the memory input and/or in response to the creation of the memory inquiry. In other words, the memory action is associated with activity. In some aspects, the memory action is linked to the activity by linking the memory action to one or more boundaries of the activity. For example, the memory action of a memory recall of memory information may be linked the activity, such that the memory information can be found by searching for the activity or presented upon detection of one or more boundaries of the activity.

At operation 420, an activity boundary linked to the activity is detected based on the enriched context signals. As discussed above, an activity boundary may be before a start of the activity, a start time of the activity, occurrence of the activity, and/or a completion of the activity. The activity boundary may be determined by evaluating the enriched context elements utilizing a learning algorithm at operation 420. If one or more boundaries associated with activity are detected at operation 420, then operation 422 is performed. If one or more boundaries associated with the activity are not detected at operation 420, then operation 420 continues to monitor newly received enriched context signals for the one or more boundaries.

In some aspect, method 400 includes operation 422. At operation 422 a determination is made as to whether a current time period is appropriate to provide the memory action. In these aspects, the enriched user context elements are evaluated to determine if the current time period is appropriate for providing the memory action at operation 422. The enriched user context elements may be evaluated utilizing notification rules. In some aspects, the notification rules are updated utilizing a learning algorithm. In these aspects, if the enriched context elements meet one or more of the notification rules, the current time period is determined to be appropriate for performing the memory action and operation 424 is performed. In these aspects, if the enriched context elements do not meet one or more of the notification rules, the current time period is determined to not be appropriate for performing the memory action and operation 422 continues to monitor received enriched user context elements until an appropriate time period is determined or until the memory action is no longer appropriate or desirable.

After operation 420 and/or 422 is performed, operation 424 is performed during method 400. At operation 424 the memory action is performed or instructions are sent to one or more client computing devices to perform the memory action.

In some aspects, method 400 includes operation 426. At operation 426, user feedback is requested and/or determined for the performed memory action. As discussed above, the user feedback may be implicit or explicit. Any determined user feedback at operation 426 is provided to operation 402 as a user signal.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
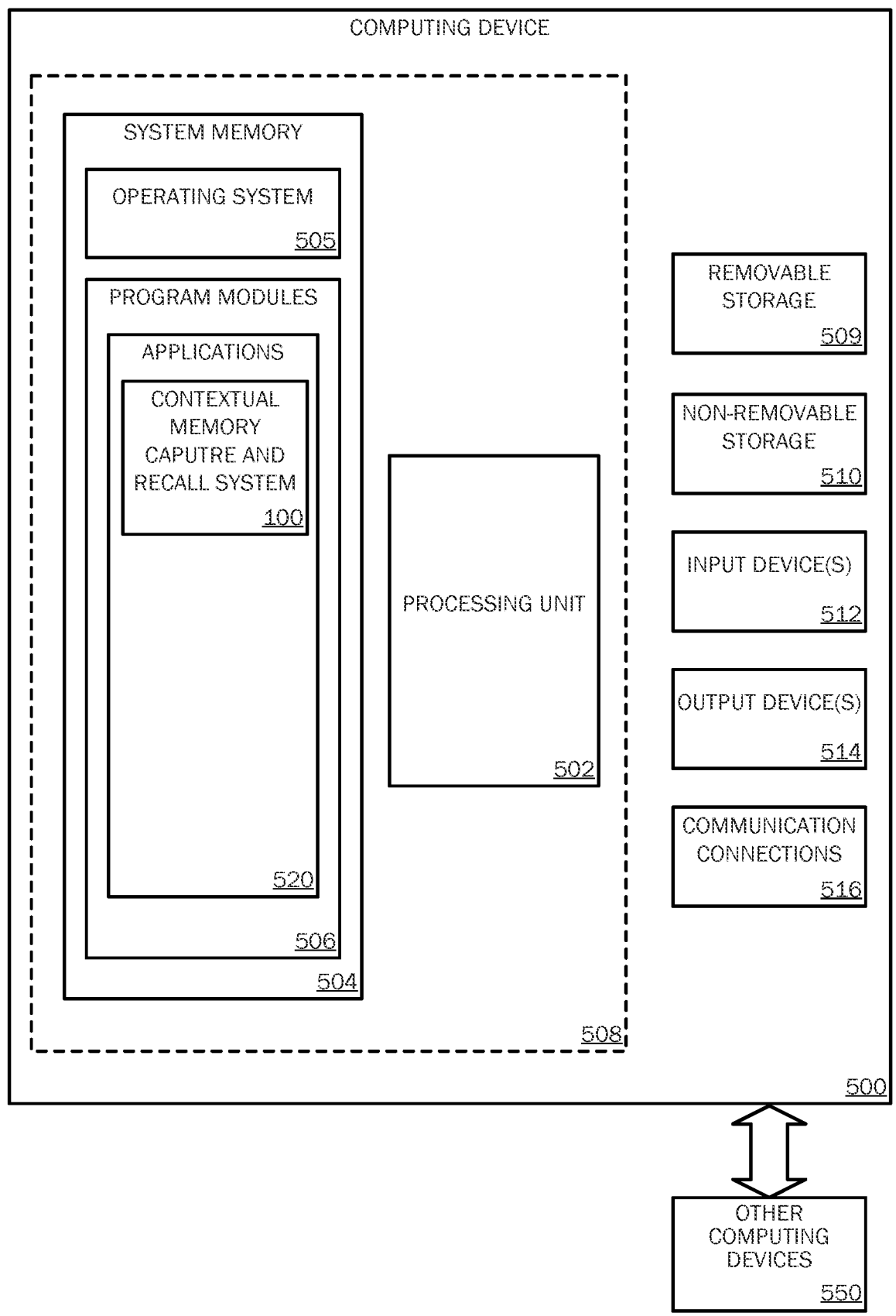
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the contextual memory capture and recall system 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the contextual memory capture and recall system 100 that can be executed to employ method 400 to build and/or use AI that models the human brain as disclosed herein.

Figure 7:
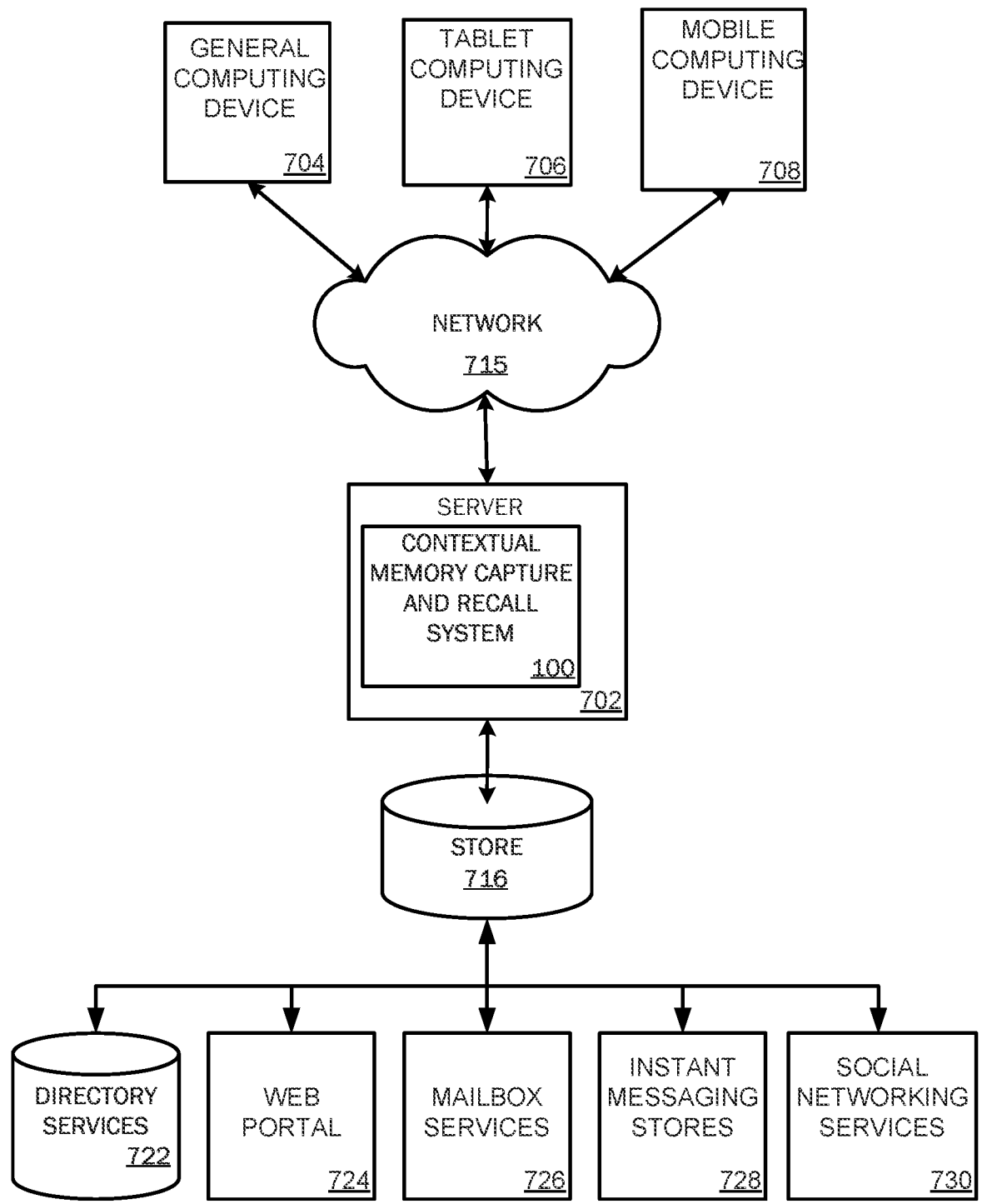
FIG. 7 is a simplified block diagram of a distributed computing system in which various aspects of the disclosure may be practiced.

In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 7 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., the contextual memory capture and recall system 100) may perform processes including, but not limited to, performing method 400 as described herein. For example, the processing unit 502 may implement the contextual memory capture and recall system 100. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc. In some aspect, the contextual memory capture and recall system 100 builds a user centric memory graph for one or more of the above referenced applications.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
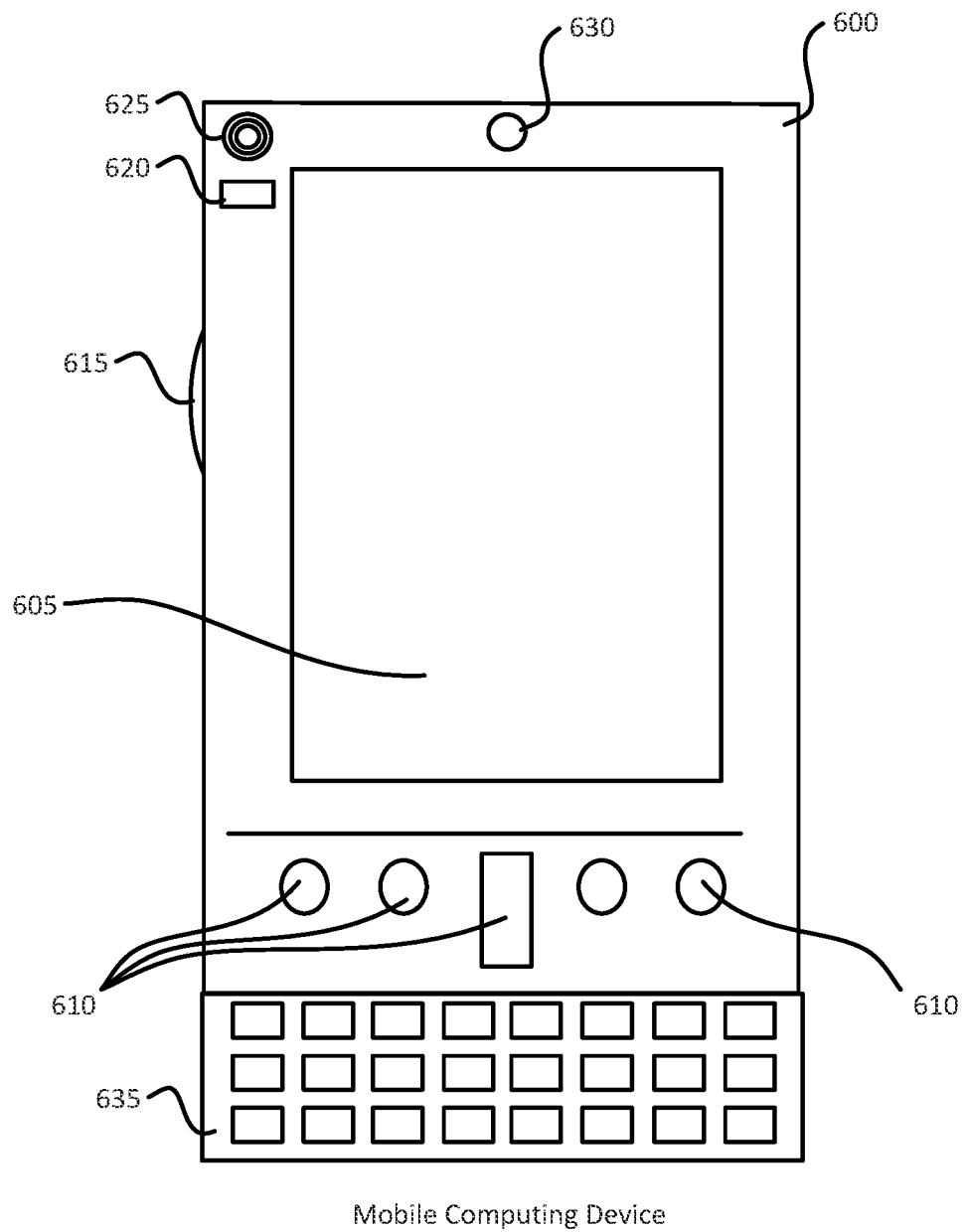
FIG. 6A is a simplified block diagram of a mobile computing device with which various aspects of the disclosure may be practiced.
Figure 6B:
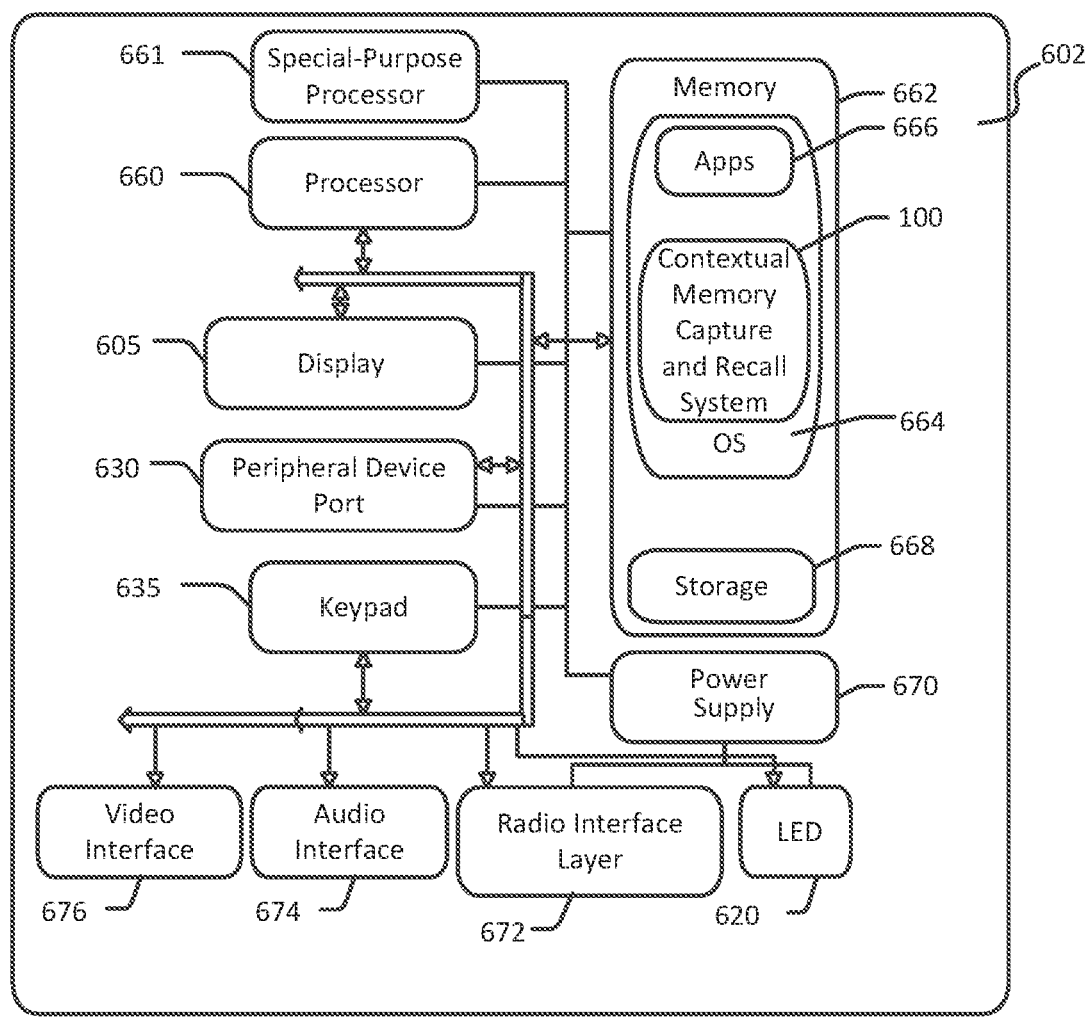
FIG. 6B is a simplified block diagram of the mobile computing device shown in FIG. 6A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666, the contextual memory capture and recall system 100 runs on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, and/or a social networking site 730. By way of example, the contextual memory capture and recall system 100 may be implemented in a general computing device 704, a tablet computing device 706 and/or a mobile computing device 708 (e.g., a smart phone). In some aspects, the server 702 is configured to implement a contextual memory capture and recall system 100, via the network 715 as illustrated in FIG. 7.

Figure 8:
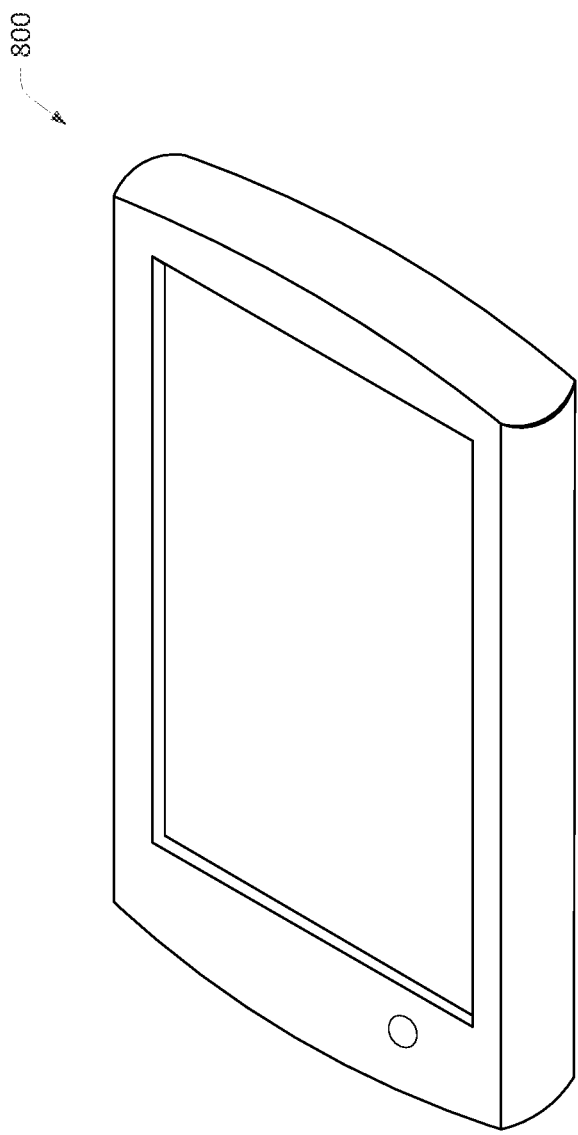
FIG. 8 illustrates a tablet computing device with which various aspects of the disclosure may be practiced

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific aspects disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various aspects disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system for contextual memory capture and recall, the system comprising:
   at least one processor; and
   a memory for storing and encoding computer executable instructions that, when executed by the at least one processor is operative to:
      generate context elements based on context signals associated with a user;
      identify an activity of the user based on the context elements, wherein the activity is a future activity;

determine that a memory inquiry for the activity is desirable based on a boundary of the activity according to inquiry rules, the memory inquiry including a proposed memory action;

create the memory inquiry based on the activity;

collect memory input in response to the memory inquiry, wherein the memory input includes memory information and an acceptance by the user of the proposed memory action;

responsive to the acceptance of the proposed memory action, generate, based on the collected memory input, a memory action, wherein the generated memory action includes a recall of the memory information;

detect, based on the context elements, a first boundary of the activity; and in response to detection of the first boundary, send the generated memory action, wherein the generated memory action includes the recall of the memory information.

2. The system of claim 1, the at least one processor is further operative to:

enrich context elements from the context signals with world knowledge to form enriched context elements;

determine a user pattern based on user signals; and update the inquiry rules based on the user pattern utilizing a learning algorithm.

3. The system of claim 1, the at least one processor is further operative to:

receive additional user information from a user pattern detection framework, wherein the additional user information is at least one of a user pattern or user feedback; and update the inquiry rules based on the additional user information utilizing a learning algorithm.

4. The system of claim 1, the at least one processor is further operative to:

analyze user signals to determine user feedback; and update the inquiry rules based on the user feedback utilizing a learning algorithm.

5. The system of claim 1, the at least one processor is further operative to:

receive user feedback and a user pattern from a user pattern detection framework; and update the inquiry rules based on the user feedback and the user pattern utilizing a learning algorithm.

6. The system of claim 1, the at least one processor is further operative to:

update the inquiry rules, creation rules, and notification rules based on at least one of a user pattern and user feedback utilizing a learning algorithm.

7. The system of claim 1, the at least one processor is further operative to:

link the generated memory action with the first boundary of the activity, wherein the first boundary is associated with occurrence of the activity by the user, and wherein the first boundary is before a start of the activity.

8. The system of claim 1, the at least one processor is further operative to:

analyze the memory input;

collect additional memory information from world knowledge based on the analysis of the memory input;

link the additional memory information with the first boundary of the activity; and in response to the detection of the first boundary, send the generated memory action to a client computing device of the user, wherein the generated memory action further includes a recall of the additional memory information.

9. The system of claim 1, the at least one processor is further operative to:

analyze the activity;

identify a related activity based on the analysis of the activity;

link the generated memory action to a second boundary of the related activity;

enrich context elements from the context signals with world knowledge to form enriched context elements;

detect the second boundary for the related activity based on the enriched context elements;

in response to detection of the second boundary, send the generated memory action to a client computing device of the user, wherein the generated memory action includes the recall of the memory information.

10. The system of claim 1, the at least one processor is further operative to:

enriching context elements from the context signals with world knowledge to form enriched context elements;

determine an appropriate time period for providing the memory inquiry based on the enriched context elements; and send the memory inquiry to a client computing device of the user during the appropriate time period.

11. A method for contextual memory capture and recall, the method comprising:

generate context elements based on context signals associated with a user;

identifying an activity of the user based on the context elements, wherein the activity is a future activity;

determining that a memory inquiry for the activity is desirable based on a boundary of the activity according to inquiry rules, the memory inquiry including a proposed memory action;

collecting memory input associated with the memory inquiry, wherein the memory input includes memory information and an acceptance of the proposed memory action;

responsive to the acceptance of the proposed memory action, generating a memory action including a recall associated with the memory input; and sending, based on occurrence of at least one boundary of the activity associated with the generated memory action including the recall, the generated memory action to the user, wherein the generated memory action includes the recall of the memory information.

12. The method of claim 11, further comprising:

enriching the context elements from the context signals with world knowledge to form enriched context elements;

detecting a first boundary for the activity based on the enriched context elements; and in response to detection of the first boundary, perform the generated memory action.

13. The method of claim 12, wherein the memory inquiry further comprises the activity and a request for memory information related to the activity.

14. The method of claim 13, wherein the memory input comprises the memory information related to the activity.

15. The method of claim 12, further comprising:

identifying additional memory information related to the activity based on an analysis of the activity utilizing world knowledge and additional user information, wherein the memory inquiry includes the activity, the additional memory information related to the activity, and a request for approval for using the additional memory information in a memory recall related to the activity.

16. The method of claim 15, wherein the memory input comprises the approval to create the memory recall for the activity.

17. The method of claim 15, wherein the memory inquiry further includes a request for memory information related to the activity, and
wherein the memory input further comprises the memory information related to the activity from the user.

18. A system for contextual memory capture and recall, the system comprising:
at least one processor; and
a memory for storing and encoding computer executable instructions that, when executed by the at least one processor is operative to:
generate context elements based on context signals associated with a user;
identify an activity of the user based on the context elements, the activity is a future activity;
determine that a memory inquiry for the activity is desirable based on a boundary of the activity according to inquiry rules, the memory inquiry including a proposed memory action;
collect memory input associated with the memory inquiry, wherein the memory input includes memory information and an acceptance of the proposed memory action;
responsive to the acceptance of the proposed memory action, generate a memory action including a recall associated with the memory information in the memory input; and
send, based on occurrence of the boundary of the activity associated with the generated memory action including the recall, the generated memory action.

19. The system of claim 18, further operative to:
collect the context signals from at least one client computing device of a user to form the context elements;
enrich the context elements with world knowledge to form enriched context elements;
detect the boundary based on the enriched context elements; and
in response to detection of the boundary, send instructions to the at least one client computing device to perform the generated memory action.

20. The system of claim 19, further operative to:
identify a related activity to the activity based on additional user information, where the related activity is a future activity;
link the generated memory action to a second boundary of the related activity;
detect the second boundary; and
in response to detection of the second boundary, perform the generated memory action.

* * * * *